United States Patent
Twietmeyer et al.

[11] Patent Number: 6,131,985
[45] Date of Patent: Oct. 17, 2000

[54] MODULAR SUN VISOR ASSEMBLY AND METHOD OF ASSEMBLING A SUN VISOR

[75] Inventors: Geoffry Alan Twietmeyer; Bret Edward Drake, both of Coldwater; Willard E. Crotty, III, Quincy, all of Mich.

[73] Assignee: Crotty Corporation, Quincy, Mich.

[21] Appl. No.: 09/145,929

[22] Filed: Sep. 3, 1998

Related U.S. Application Data

[63] Continuation-in-part of application No. 08/703,819, Aug. 27, 1996, Pat. No. 5,823,603, which is a continuation-in-part of application No. 08/515,036, Aug. 14, 1995, Pat. No. 5,580,118.

[51] Int. Cl.[7] ........................................................ B60J 3/02
[52] U.S. Cl. ....................................... 296/97.12; 296/97.1
[58] Field of Search .............................. 290/97.12, 97.1, 290/97.5, 97.8, 97.9, 97.11, 97.13

[56] References Cited

U.S. PATENT DOCUMENTS

| | | |
|---|---|---|
| 5,004,289 | 4/1991 | Lanser et al. ........................ 296/97.12 |
| 5,042,867 | 8/1991 | Crotty, III et al. ..................... 296/97.8 |
| 5,131,711 | 7/1992 | Laferle .................................. 276/97.1 |
| 5,205,635 | 4/1993 | Van Order et al. ..................... 362/83.1 |
| 5,205,639 | 4/1993 | White et al. ............................ 362/137 |
| 5,365,416 | 11/1994 | Peterson ................................. 362/135 |
| 5,580,118 | 12/1996 | Crotty, III ............................ 296/97.12 |
| 5,823,603 | 10/1998 | Crotty, III ............................ 296/97.12 |
| 5,860,690 | 1/1999 | Dellinger et al. ...................... 296/97.1 |
| 5,887,933 | 3/1999 | Peterson ................................. 296/97.1 |

*Primary Examiner*—Joseph D. Pape
*Attorney, Agent, or Firm*—Baker & Daniels

[57] ABSTRACT

A sun visor assembly which utilizes a plurality of modular visor core components and an outer covering. The visor core components each include an alignment element which cooperates with an alignment element on the outer covering thereby maintaining the visor core components in the proper location. The modularity of the visor core components allows for their use with any one of a plurality of differently configured outer coverings and in a plurality of different visor core component combinations. The modular components include a hinge block for rotatably engaging a visor support rod, a pin section having an exposed support member for supporting a free end of the visor blade and track components for slidingly engaging other components such as a sun visor extension panel.

7 Claims, 10 Drawing Sheets

FIG. 29

MODULAR SUN VISOR ASSEMBLY AND METHOD OF ASSEMBLING A SUN VISOR

This is a Continuation-in-Part of U.S. application Ser. No. 08/703,819 filed on Aug. 27, 1996, now U.S. Pat. No. 5,823,603 which issued on Oct. 20, 1998, which is a Continuation-in-Part of U.S. application Ser. No. 08/515,036 filed on Aug. 14, 1995, now U.S. Pat. No. 5,580,118.

BACKGROUND OF THE INVENTION

1. Field of the Invention

The present invention relates generally to sun visors for vehicles, and, in particular, to a sun visor having an inner core and a covering assembly folded over the inner core and fastened to itself to secure the core within the covering assembly.

2. Description of the Related Art

It is well known to provide a sun visor for the windshield of a vehicle, wherein the sun visor is mounted on the vehicle body roof for movement between a storage position adjacent the vehicle headliner, a first use position adjacent the windshield, and a second use position adjacent a side door window opening. A conventional sun visor comprises a solid inner core board of a pressed wood material and an outer cloth covering of a foam-backed cloth adhered to or otherwise connected to a kraft paper foundation. The covering is folded over the core board and is edge sewn along a seam circumjacent the periphery of the core board. More recently, there has been developed a sun visor having a molded plastic inner core. In U.S. Pat. No. 5,365,416, there is disclosed a sun visor having a plastic inner core and an outer covering assembly folded over the plastic core in the manner previously described. It is desired to improve the assembly of sun visors.

SUMMARY OF THE INVENTION

The present invention provides a plurality of modular visor core components which may be utilized with different covering assemblies and in different combinations.

The invention comprises, in one form thereof, an elongate visor core assembly comprising three detachable segments which may be secured within any one of a plurality of differently configured outer coverings to thereby manufacture a vehicle sunshade. Aligning elements are used to secure the visor core components within the outer covering. By substituting one or more of the three visor core segments, the configuration of the visor core assembly can be altered to accommodate an even larger number of outer coverings.

The invention comprises, in another form thereof, additional modular visor core components such as a vanity mirror support, a support member for engaging a retainer clip, a pair of tracks which hold a visor extension and a slidable hinge block and track which permits the visor to slide on the visor support rod. These modular visor core components are secured within any one of a variety of differently configured outer coverings in a spaced configuration. Aligning elements, which are preferably placed in standardized locations on the components are used to align and secure the visor core components with the outer covering. Additionally, the modular visor core components can be used in a variety of different combinations to manufacture sunshades having a corresponding variety of different features.

An advantage is that the visor core components can be used with a variety of different outer coverings. This permits the same visor core components to be used in sunshade assemblies for a number of different vehicle makes and models and thereby reduces the number of different visor cores which must be manufactured and provides for more efficient manufacture of the visor cores.

Another advantage of the present invention is that less material is required to manufacture a visor core which utilizes spaced modular visor core components.

Yet another advantage is the modularity of the visor core components which permit the same components to be used in different combinations. The modularity of the components increases flexibility in the manufacture of visors as well as reducing the number of different visor core designs which must be manufactured.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

Figure 1:
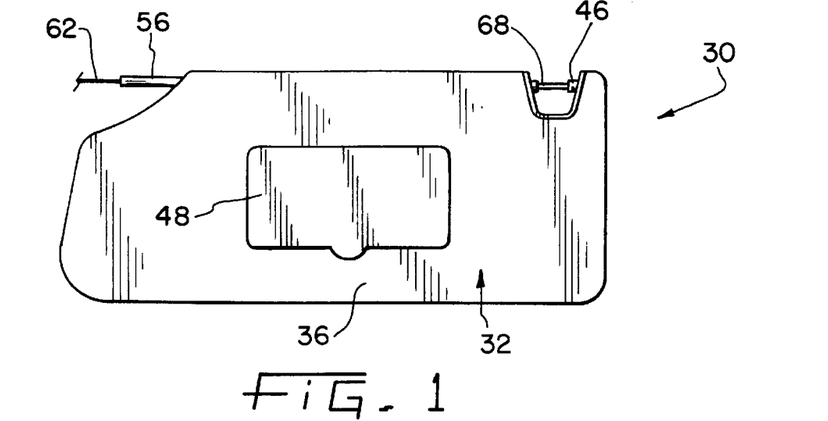
FIG. 1 is a plan view of a sunshade assembly manufactured with modular visor core components.
Figure 2:
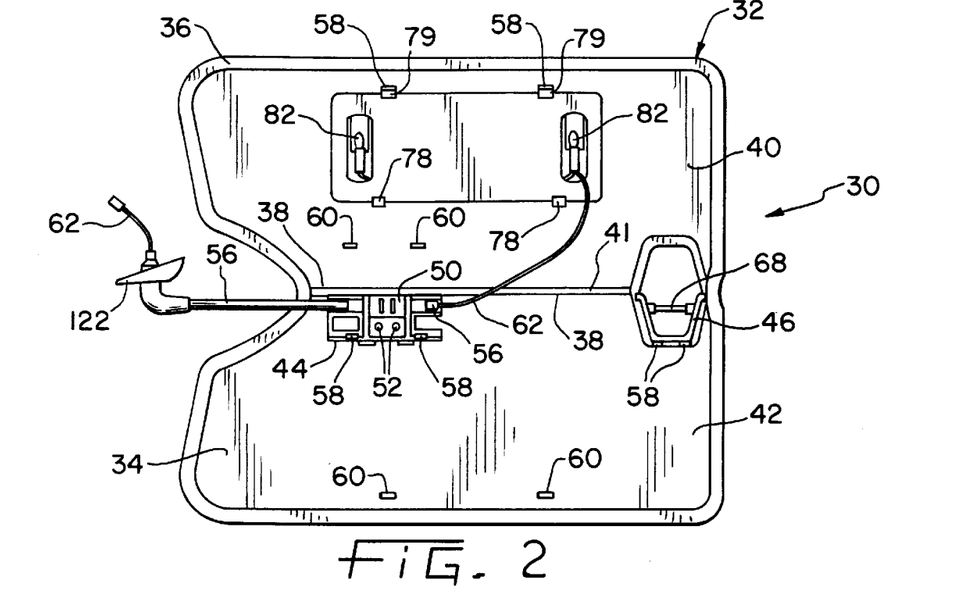
FIG. 2 is a plan view of an outer covering and visor core components.

The embodiments disclosed below are not intended to be exhaustive or limit the invention to the precise forms disclosed in the following detailed description. A sun visor assembly 30 is shown in FIGS. 1 and 2. Certain details of the sun visor assembly 30, which may be of any suitable type known in the art, are only partially shown and described or omitted entirely, in the interest of clarity.

The illustrated visor assembly 30 includes an outer covering 32 which comprises a rigid foundation 34 and an exterior upholstery material 36. Rigid foundation 34 may be a kraft paper foundation or may be formed of other materials having suitable stiffness and weight characteristics and is preferably formed of a single piece of material. The rigid foundation 34 is creased or scored at lines 38 to subdivide the outer covering 32 into opposing flap sections 40 and 42 and hinge section 41. Suitable upholstery materials known in the art include fabric, vinyl, or cloth with a bonded foam backing. Upholstery material 36 is adhesively or otherwise attached to foundation 34 along the edges of rigid foundation 34 in any well known manner.

During visor construction, outer covering 32 is folded over one or more visor core components and is attached to itself, for example by adhesives or by sewing, substantially along its outer perimeter to form a double layered peripheral edge.

Also included in the visor assembly 30 are several visor core components including hinge block 44, pin section 46 and vanity mirror assembly 48. Hinge block 44, shown in FIGS. 2 and 4–6, includes a detent clamp 50 which is secured with rivets 52 to the hinge block member 54. The generally teardrop-shaped metal detent clamp 50 is secured to hinge block member 54 with rivets 52 and receives a visor support rod 56 which is slidably inserted therethrough. Flats on rod 56 cooperate with detent clamp 50 to hold sun visor assembly 30 in the park position. The use of a hollow visor support rod allows electrical circuitry 62 to be routed to the interior of the sun visor assembly 30 where it may be connected to an amenity unit such as an illuminated vanity mirror as shown in FIG. 2.

Figure 24:
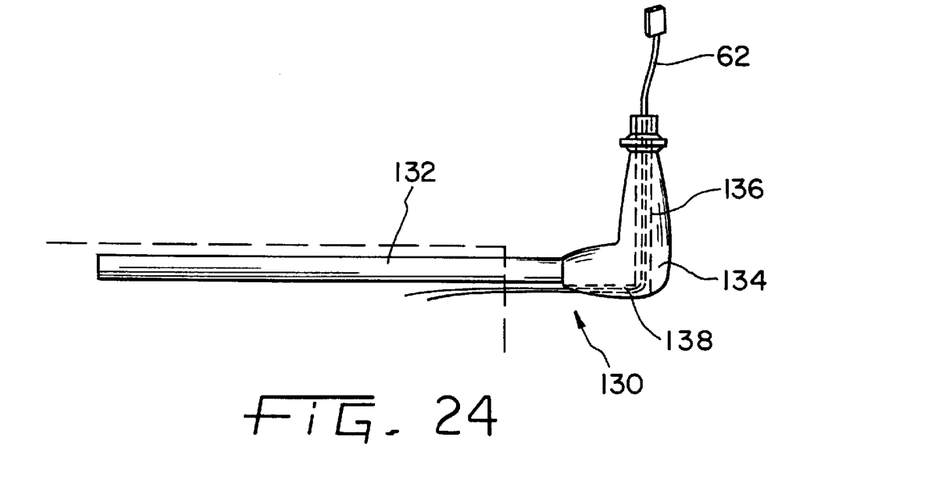
FIG. 24 is an elevational view of an integral plastic visor support shaft and elbow.
Figure 25:
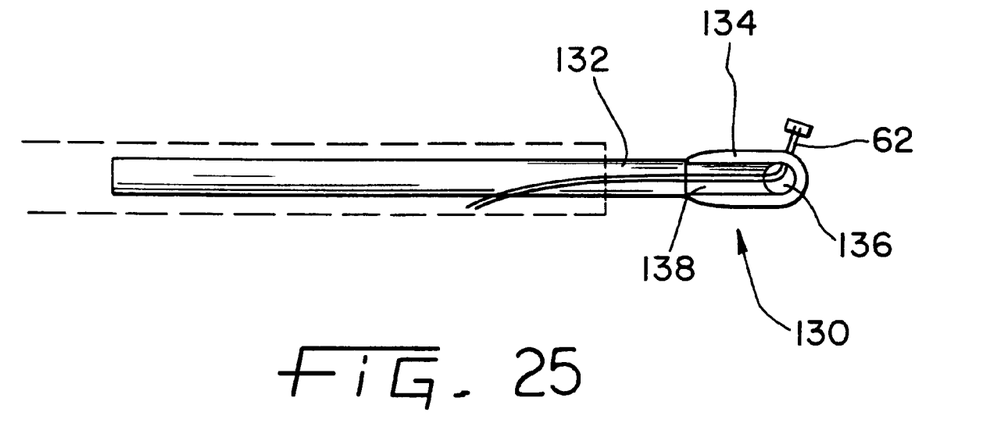
FIG. 25 is a bottom view of the integral visor support shaft and elbow of FIG. 24.

It is also known in the prior art to use a one piece nylon plastic component 130 comprised of a solid visor support rod 132 and an elbow 134 which is formed integrally with the rod 132 and which permits the routing of electrical wiring 62 to the interior of a sun visor assembly. As seen in FIGS. 24 and 25, elbow 134 has a generally vertical portion having a bore hole 136 through which electrical wiring 62 may be routed to the interior of the vehicle. A groove 138 is located on the bottom of the generally horizontal portion of the elbow 134 for concealing electrical wiring 62. The wiring is then routed alongside a short length of the solid support rod 132 until it is enclosed by the outer covering of the visor blade, partially shown in dashed outline in FIGS. 24 and 25.

The hinge block member 54, as well as the other visor core components, is formed of molded plastic, preferably of ABS or polypropylene but may also be formed of metal or other suitable materials.

Figure 8:
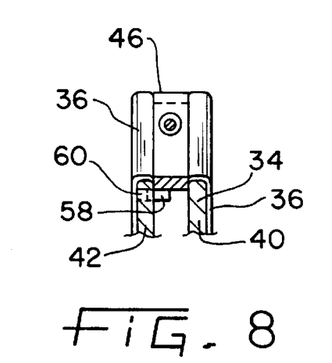
FIG. 8 is a cross-sectional view of the pin section and an outer covering taken along line 8—8 of FIG. 7.

Extending from hinge block member 54 are several pegs 58 which function as alignment elements. The pegs 58 may be integrally molded with hinge block 54 and extend from a plurality of locations on the hinge block 54. Pegs 58 interfit with alignment elements which take the form of holes 60 located in the rigid foundation 34. As clearly shown in FIGS. 6 and 8, holes 60 are configured so that when rectangular shaped pegs 58 extending from a visor core component are inserted therein, the pegs 58 will frictionally engage the surfaces of rigid foundation 34 which define the holes 60. The holes 60 and pegs 58 are placed so as to correctly position the visor core component within the sunshade assembly 30.

Figure 3:
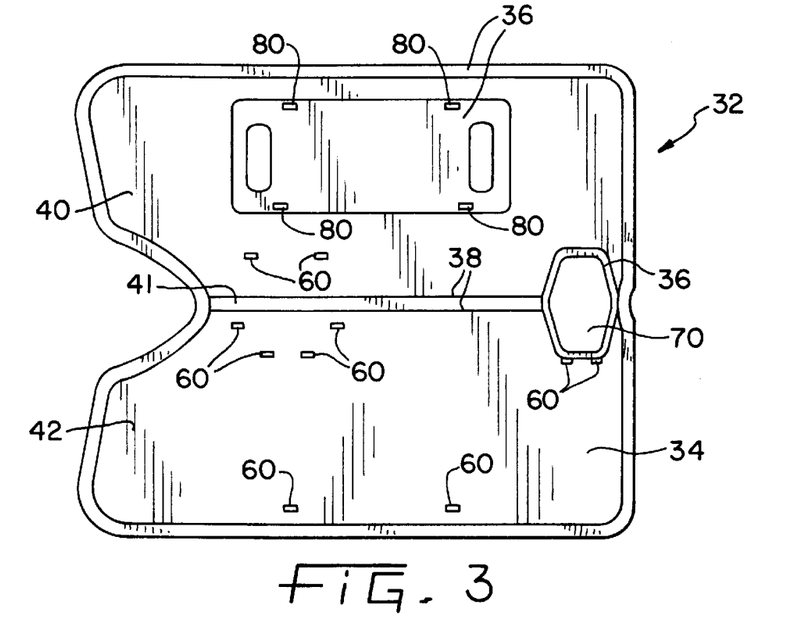
FIG. 3 is a plan view of an outer covering.
Figure 4:
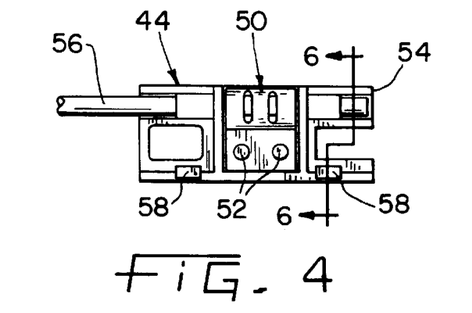
FIG. 4 is a side view of a hinge block.
Figure 5:
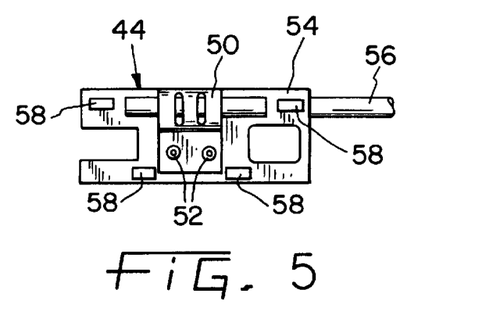
FIG. 5 is another side view of the hinge block of FIG. 4.
Figure 6:
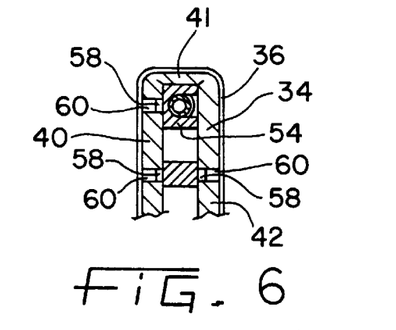
FIG. 6 is a cross-sectional view of the hinge block and an outer covering taken along line 6—6 of FIG. 4.
Figure 7:
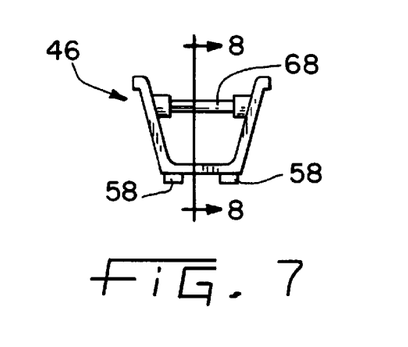
FIG. 7 is a side view of a pin section.

FIG. 3 illustrates one configuration of holes 60, however, different quantities, positioning and shaping of the alignment elements 58 and 60 may also be used. For example, the visor core components could all utilize pegs which extend in a common direction and engage holes on a single flap of the outer covering. Additionally, the projecting alignment elements could be located on the outer covering 32 and be fitted into recesses on the visor core components during assembly.

During assembly of the sunshade assembly 30, the core components are preferably aligned on the splayed open flaps of the outer covering 32 and pegs 58 are inserted into holes 60 on one of the two flaps 40 and 42 or otherwise attached to one of the flaps by the use of alignment elements. The flaps 40 and 42 are then folded with respect to hinge section 41 along score lines 38 to place the flaps into their assembled position. As the flaps are moved into their final assembled position the remaining pegs 58 snap fit into engagement with their respective holes 60 to thereby retain the visor core components in their proper positions within the sunshade assembly 30. The outer covering flaps 40 and 42 are then secured together along their outer periphery with stitching, adhesives or some other suitable attachment means.

Figures 12, 13, 14:
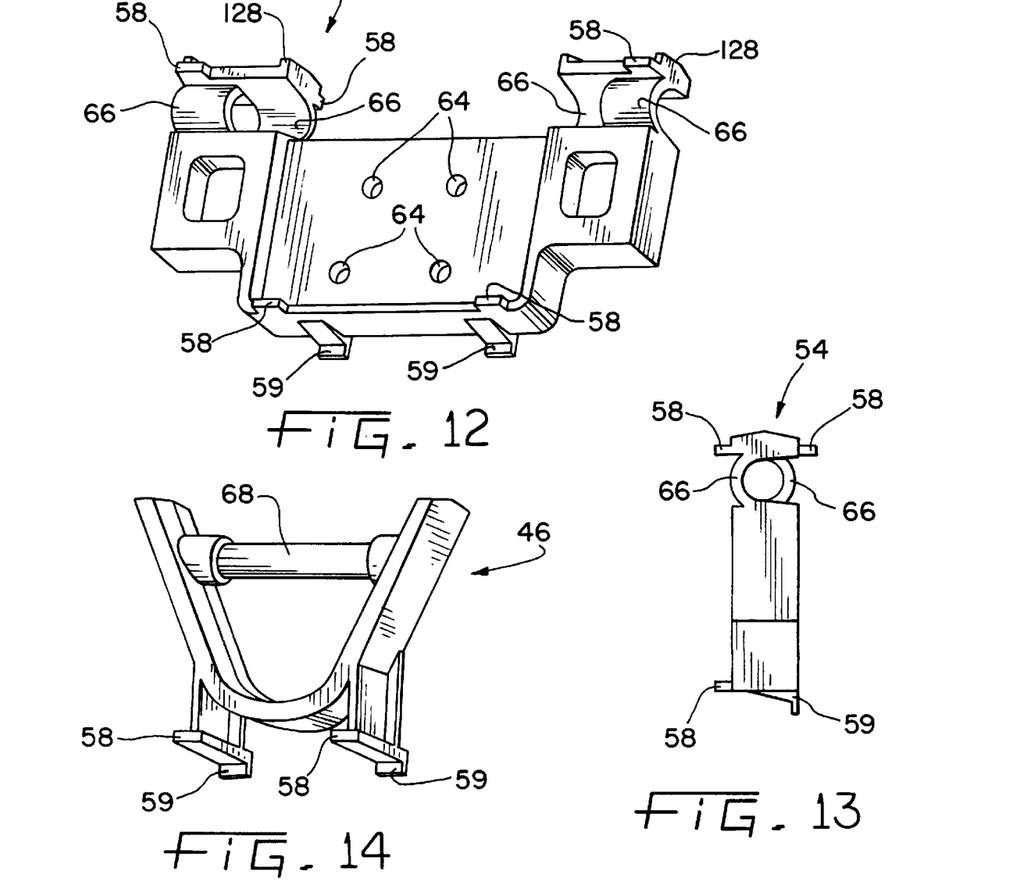
FIG. 12 is a perspective view of a second hinge block.
FIG. 13 is an edge view of the hinge block of FIG. 12.
FIG. 14 is a perspective view of a second pin section.

A second embodiment of a hinge block member 54 is shown, without a detent clamp, in FIGS. 12 and 13. Fasteners may be inserted through apertures 64 to attach a detent clamp, or some other suitable device for engaging a visor support rod, to the hinge block member 54. Pegs 58 and interfitting holes 60 are used as alignment elements. Semicircular rod guides 66 are shown in FIGS. 12 and 13 and cooperate with a visor support rod which is not shown. Also shown in FIGS. 12 and 13 is heel 59 which abuts against the inner surface of rigid foundation 34 when the sunshade assembly 30 is completed and thereby prevents opposingly disposed peg 58 from disengaging from a hole 60.

Pin section 46, shown in FIGS. 1–2 and 7–8, is also formed of molded plastic and includes a cylindrical pin 68 which may be snap fit into a retainer located in the vehicle interior to support the free end of the sun visor assembly 30 once it has been installed in a vehicle. The pin section 46 is located at a cutout 70 (FIG. 3) in the outer covering 32 and has a support member, in this case pin 68, which remains visible in the completed sun visor assembly 30 (FIG. 1). An alternative embodiment of the pin section 46 is shown in FIG. 14.

Figure 9:
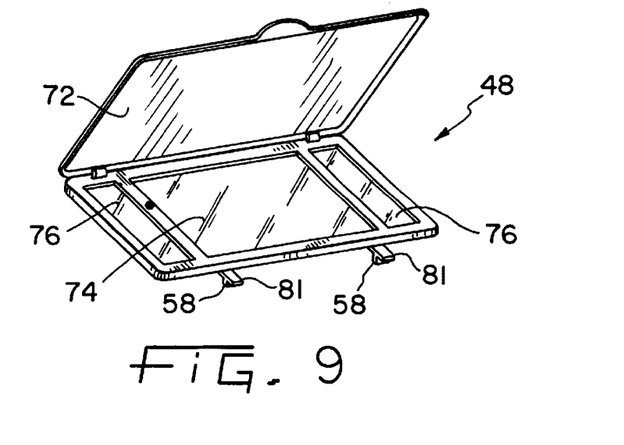
FIG. 9 is a perspective view of an illuminated vanity mirror assembly.
Figure 10:
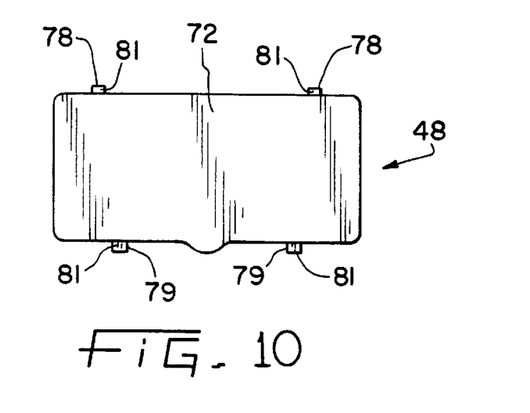
FIG. 10 is a plan view of the vanity mirror assembly of FIG. 9.
Figure 11:
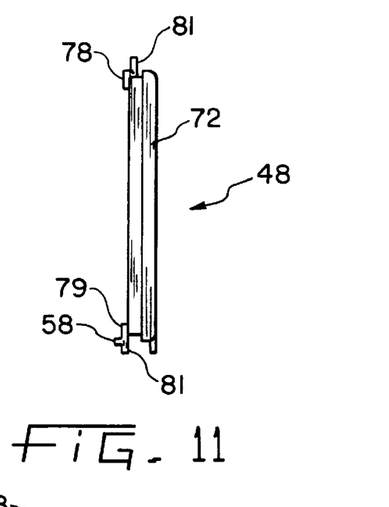
FIG. 11 is an edge view of the vanity mirror assembly of FIG. 9.

Another visor core component is comprised of retainer clips 78 and 79 which are the means of support for vanity mirror assembly 48, shown in FIGS. 1–2 and 9–11. The vanity mirror 48 includes a cover 72, a mirror 74 and two illuminated panels 76 (FIG. 9). The vanity mirror assembly 48 is both supported and properly positioned by retainer clips 78 and 79. Retainer clips 79 have pegs 58 which extend therefrom and interfit with holes 60 located in the rigid foundation 34. Retainer clips 78 and 79 extend through holes 80 in upholstery material 36 to engage the interior surface of rigid foundation 34 as shown in FIG. 2. Retainer clips 78 and 79 engage the interior surface of rigid foundation 34 with lip surfaces 81. It has also been found to be advantageous to interchange the position of clips 78, 79 so that clips 79 are at the top of vanity mirror 48 and clips 78 are at the bottom of vanity mirror 48.

As shown in FIG. 2, upholstery material 36 is also removed from directly behind lamps 82 which provide illumination for panels 76. Non-illuminated vanity mirror assemblies may also be used, in which case lamps 82 are not present in vanity mirror assembly 48.

Figure 22:
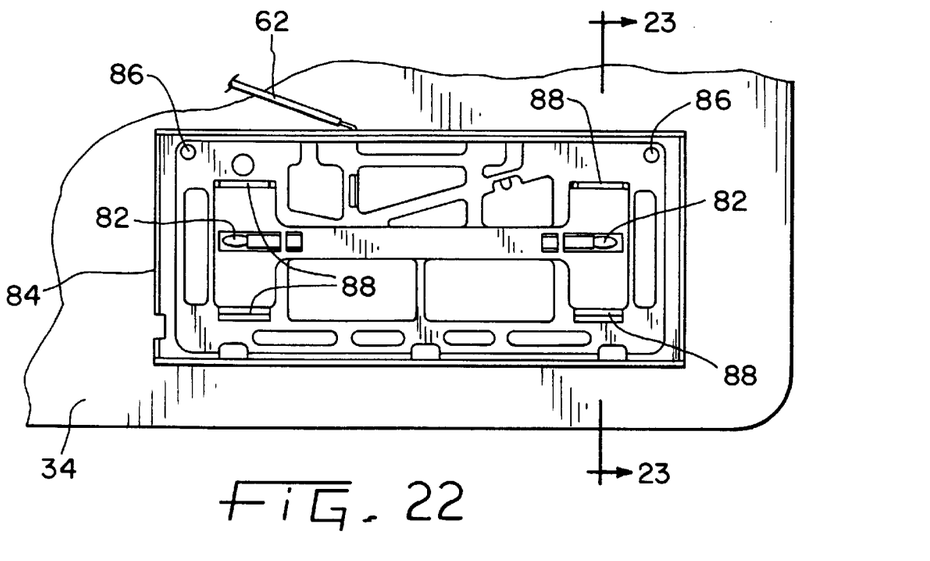
FIG. 22 is a partial plan view of a vanity mirror backing panel and outer covering.
Figure 23:
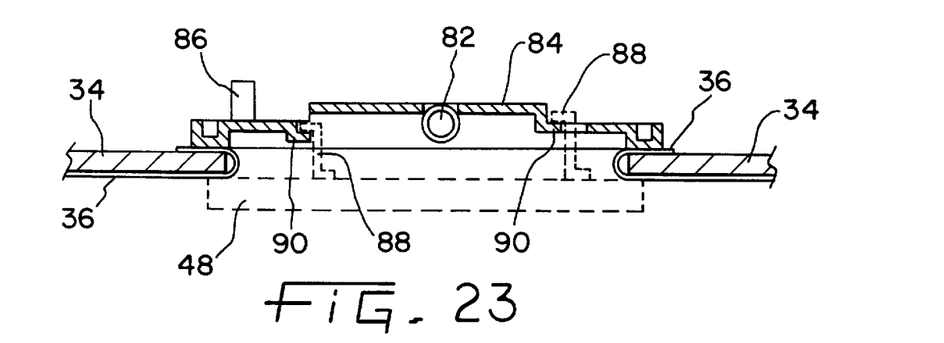
FIG. 23 is a cross-sectional view taken along line 23—23 of FIG. 22.

A second means of supporting a vanity mirror assembly 48 on a sun visor assembly 30 is shown in FIGS. 22 and 23. In this embodiment, a backing panel 84, made of molded plastic, is secured to the interior surface of rigid foundation 34 with alignment elements such as upstanding pegs 58 or T-shaped projections 100. Adhesives may also be used to more firmly secure the backing panel 84 to the outer covering 32. Backing panel 84 has spacers 86 which maintain the opposite flaps of outer covering 32 at the desired distance in the completed sun visor assembly 30. Lamps 82 may be installed in backing panel 84 to provide illumination for vanity mirror assembly 48. The mirror, shown schematically in FIG. 23 can be attached to the sun visor assembly 30 with clips 88 which engage shelves 90 on the backing panel 84. The backing panel 84 may also be designed to utilize other attachment methods to secure the vanity mirror 48, or even an entirely different amenity unit, to the sun visor assembly 30.

Figure 29:
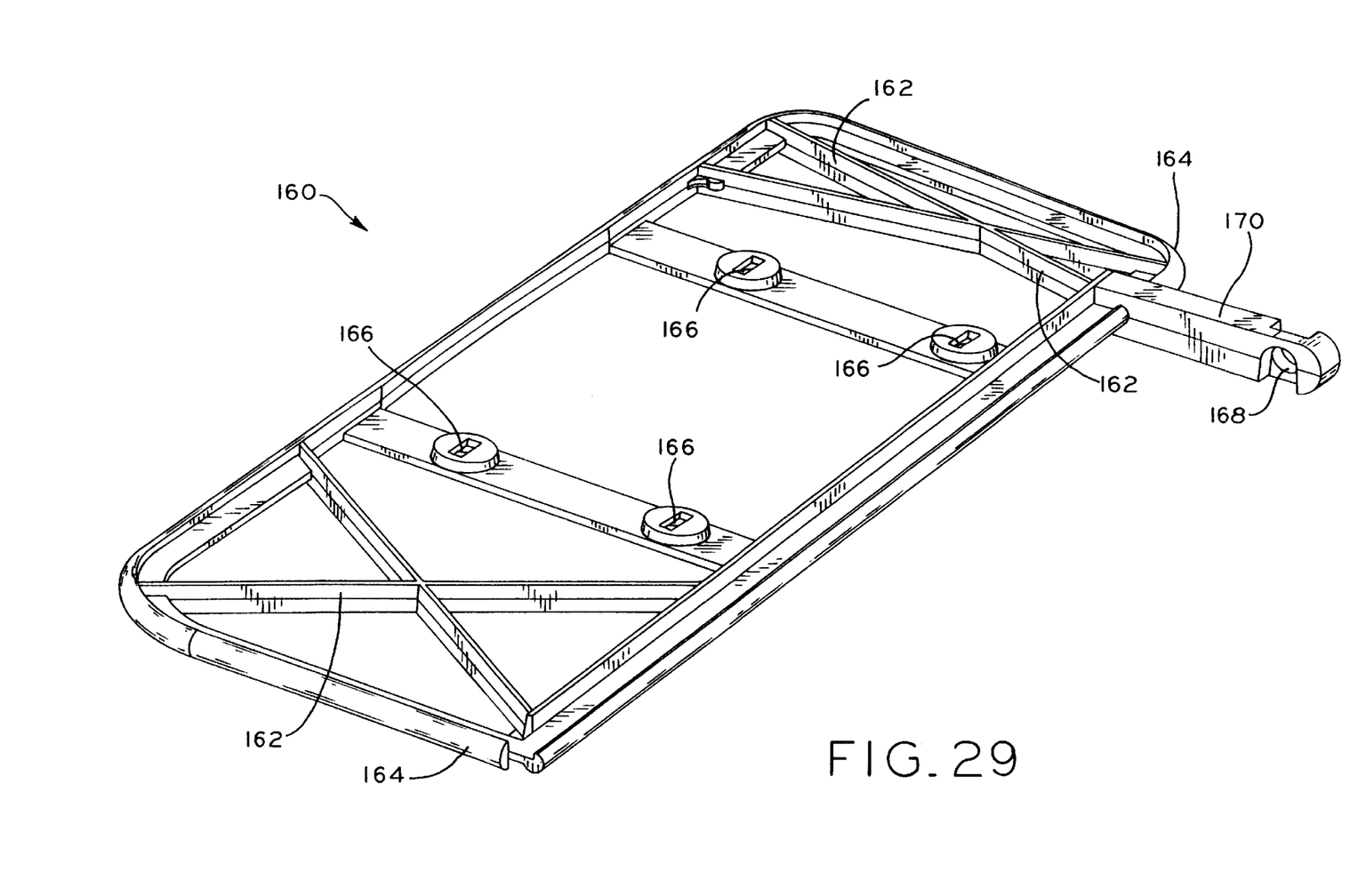
FIG. 29 is a perspective view of a vanity mirror backing panel.

A third means of supporting a vanity mirror assembly 48 on a sun visor assembly 30 is shown in FIG. 29. In this embodiment, a backing panel 160, made of molded plastic, is secured to the interior surface of rigid foundation 34 with alignment elements such as upstanding pegs 58 or T-shaped projections 100. Adhesives may also be used to more firmly secure the backing panel 160 to the outer covering 32. Backing panel 160 includes ribs 162 which increase the structural integrity of backing panel 160 and the overall sunshade. Round edges 164 surround the periphery of the backing panel and form a smooth frame for the visor. As further shown in FIG. 29, four rectangular slots 166 receive the pegs 58 (FIG. 9) formed on mirror assembly 48, whereby the pegs snap into slots 166. However, backing panel 160 may also be designed to utilize other attachment methods to secure the vanity mirror 48, or even an entirely different amenity unit, to the sun visor assembly 30. A visor assembly 30 including backing panel 160 would also include a hinge block 44, such as that shown in FIG. 2. Support rod 56 fits into aperture 168 on arm 170 as shown in FIG. 29.

Figure 17:
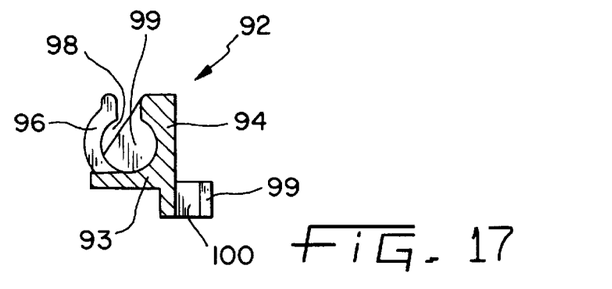
FIG. 17 is a cross-sectional view of the track component taken along line 17—17 of FIG. 16.

Tracks 92, shown in FIGS. 15–18 and FIG. 26, may be used to secure a sliding member to the sun visor assembly 30. As shown in FIGS. 15–18, track 92 comprises two series of opposing arms 94 and 96 which define a keyhole shaped elongate passageway 98 as shown in FIG. 17. A track 92 may project from an elongate member 93 or from another modular component such as elongate visor core component 112. Elongate member 93 has an L-shaped cross section and a plurality of alignment elements which take the form of T-shaped pegs 100.

Figure 15:
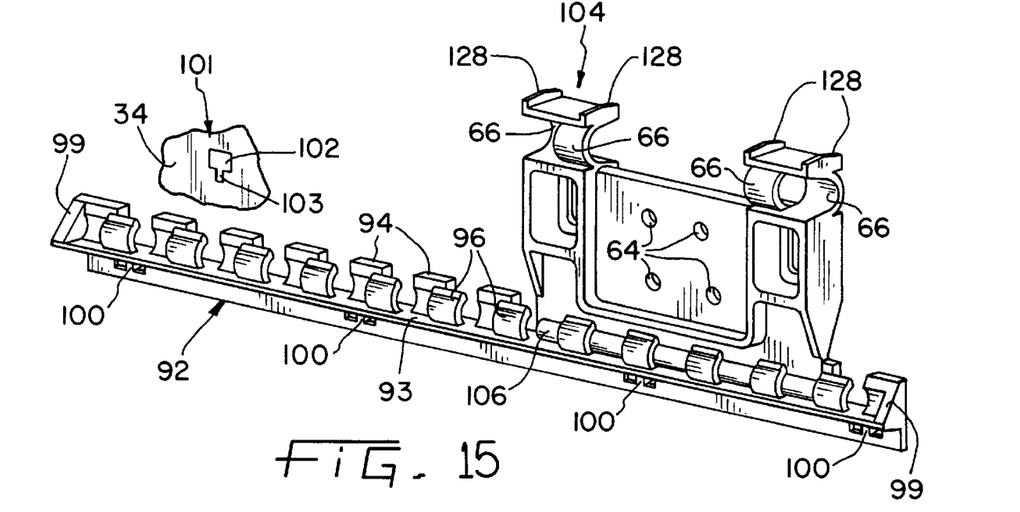
FIG. 15 is a perspective view of a track component and sliding hinge block.
Figure 16:
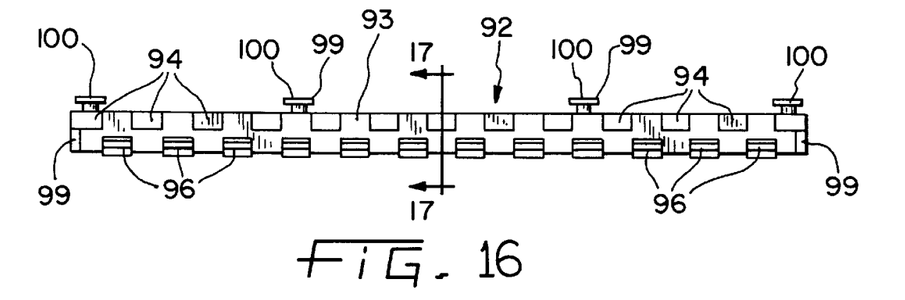
FIG. 16 is a plan view of a track component.

T-shaped pegs 100 engage slotted apertures 101 in the rigid foundation 34 (FIG. 15). Slotted apertures have a square receiving aperture 102 into which the head 99 of T-shaped peg 100 is inserted. The T-shaped peg 100 is then slid into slot 103 to securely engage the T-shaped peg 100 with the rigid foundation 34. T-shaped pegs 100 may be used as alignment elements on other visor core components or, alternatively, extend from the rigid foundation 34 and engage slotted apertures 101 located on the visor core components.

A number of different sliding members may be slidingly engaged with track 92. One such sliding member is sliding hinge block member 104 which is similar to hinge block member 54 except for the slide rod 106 which projects from the bottom of sliding hinge block member 104. Slide rod 106 is slidingly disposed in passageway 98. End plates 99 limit the extent of movement between hinge block member 104 and track 92 once sliding rod 106 has been snap-fit into engagement with track 92. By placing resilient arms 94, 96 in a spaced arrangement whereby the opposing arms are staggered along the longitudinal axis, as clearly seen in FIG. 15, projection 106 may be readily snap fit into engagement with track 92.

Figure 26:
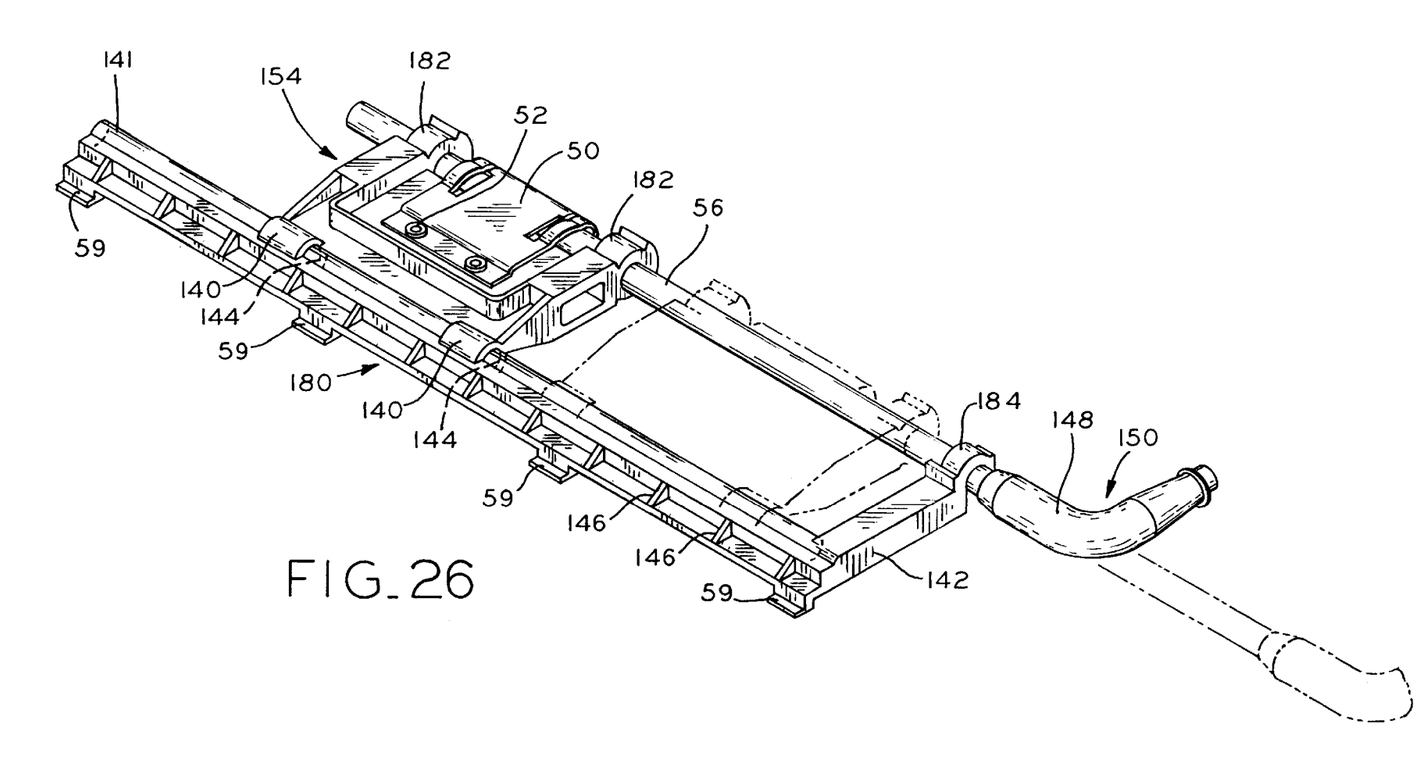
FIG. 26 is a perspective view of an embodiment of a track component and a sliding hinge block.

Another embodiment of track 180 is shown in FIG. 26, wherein track 92 comprises a rail 141 which extends substantially the entire length of track 180. Track 180 includes track elbow 142 including a rod guide 184 on its distal end which circumscribes visor support rod 56. Track 180 also includes heels 59 which abut against the inner surface of rigid foundation 34 when the sunshade assembly is completed. Webs 146 provide structural integrity to track 180.

Figure 27:
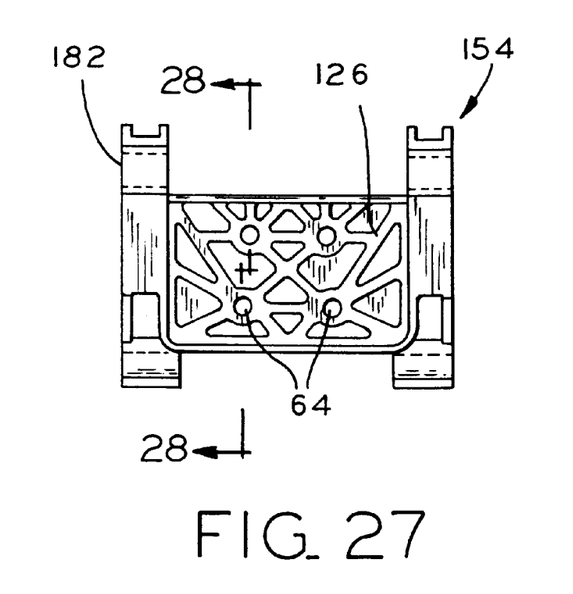
FIG. 27 is a plan view of the hinge block of FIG. 26.
Figure 28:
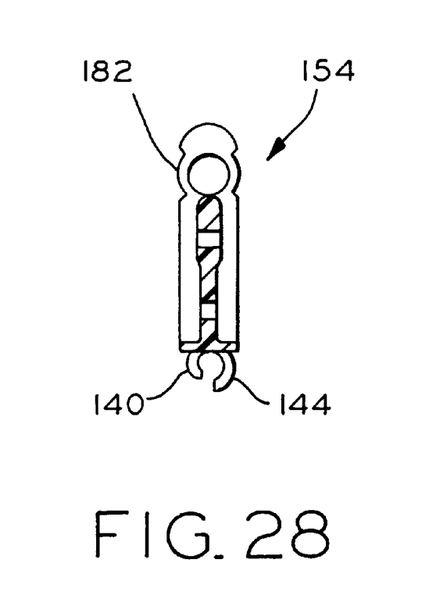
FIG. 28 is a cross sectional view taken along line 28—28 of the hinge block of FIG. 27.

Track 180 also includes an engagement means for slidably engaging hinge block member 154. Hinge block member 154 is similar to hinge block member 54, except with respect to the means by which hinge block member 154 engages track 180. In the embodiment shown in FIG. 26, track 180 employs rail 141 as an engagement means, which means has a generally round cross section thereby facilitating sliding engagement with the semicircular opposing arms 140, 144. As shown in FIGS. 27 and particularly in FIG. 28, semicircular shaped opposing arms 140,144 form a clip for engaging rail 141. That is, the clip formed by opposing arms 140,144 comprises a second engagement means for slidably engaging the first engagement means.

Referring again to FIG. 26, it can be appreciated that hinge block member 154 can slide along track member 180 as illustrated in phantom lines in FIG. 26. Track elbow 142 provides a stop for hinge block member 154. Visor support rod 56 includes a plastic casing 148 surrounding elbow 150 of visor support rod 56. Casing 148 abuts against rod guide 182 as shown in FIG. 26 when the visor support rod is fully retracted.

It can now be appreciated that the present invention discloses multiple engagement means to slidably engage a sliding member with track 92, 180. The embodiments shown in FIGS. 15–18 disclose an elongate passageway with a projection slidably disposed therein. By contrast, the embodiment shown in FIGS. 26–28 discloses opposing arms 140,144 forming a clip which slidably engages rail 141. The engagement means disclosed by these two embodiments are fully interchangeable, the latter of the two being more simple to tool and manufacture. Further, with the embodiment shown in FIGS. 26 to 28, it is easier to maintain the sliding efforts, and to tune the efforts to a desired specification. Structural integrity in both hot and cold environments is also improved in this embodiment. Finally, the embodiment depicted in FIGS. 26 to 28 produces less noise when sliding.

Figure 18:
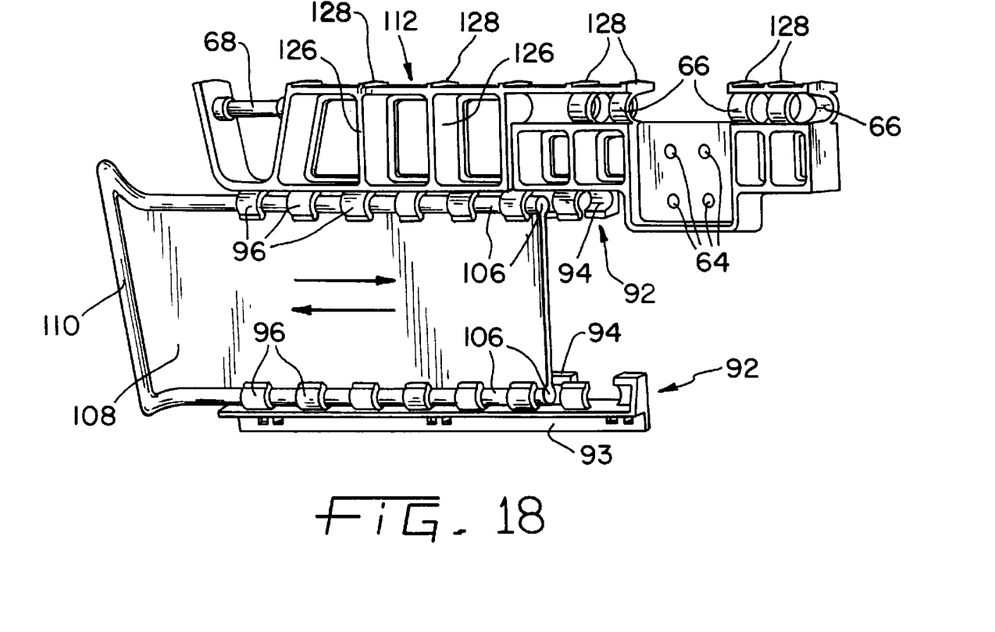
FIG. 18 is a perspective view of a visor core assembly which includes a slidable extension panel.

A second sliding member, visor extension panel 108, is shown in FIG. 18. Extension panel 108 has sliding rods 106 on two edges in sliding engagement with an upper and lower track 92. The extension panel has a lip 110 which is not enclosed within the outer covering 32. In an assembled sun visor assembly, lip 110 may be grasped to reposition extension panel 108 and thereby increase or reduce the overall length and shading capability of the sun visor assembly 30.

In FIG. 18 the upper track 92 is integral with an elongate visor core component 112 which includes a hinge block and pin member. It would also be possible to use tracks 92 disposed on elongate members 93 to slidingly engage both the upper and lower sliding rod 106 of visor extension panel 108. The use of a single track 92 engaging only one sliding edge 106 of visor extension panel 108 is also envisioned. It is further envisioned that the engagement means discussed above for the embodiment shown in FIGS. 26–28 could be employed for the extension panel 108 and core component 112 shown in FIG. 18.

Figure 19:
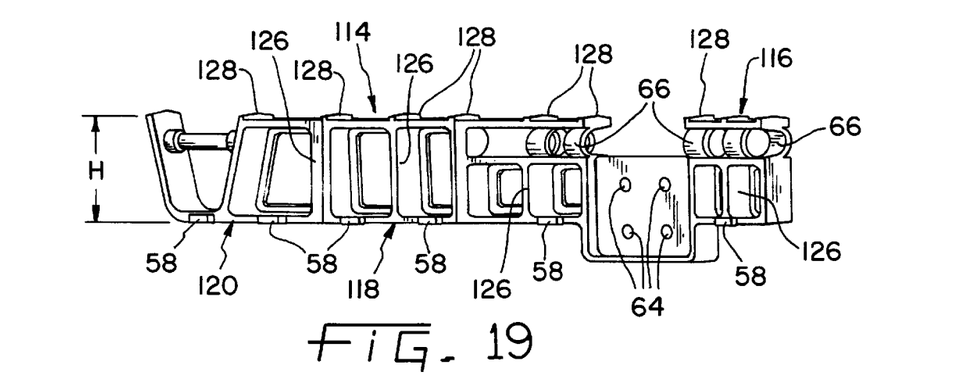
FIG. 19 is a perspective view of an elongate visor core having a plurality of visor core components.
Figure 20:
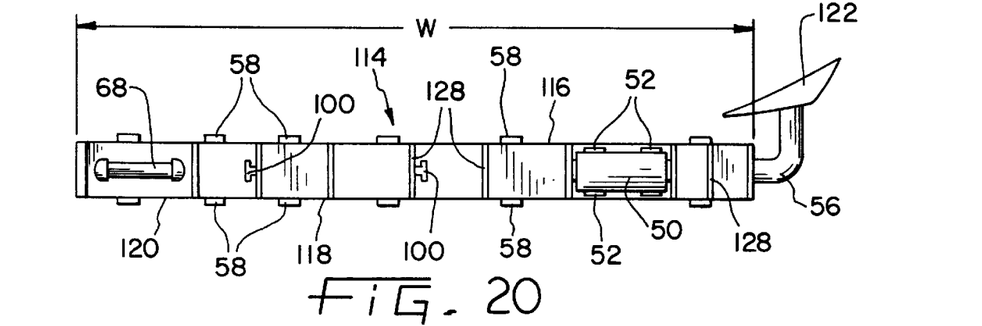
FIG. 20 is a top view of the visor core of FIG. 19.
Figure 21:
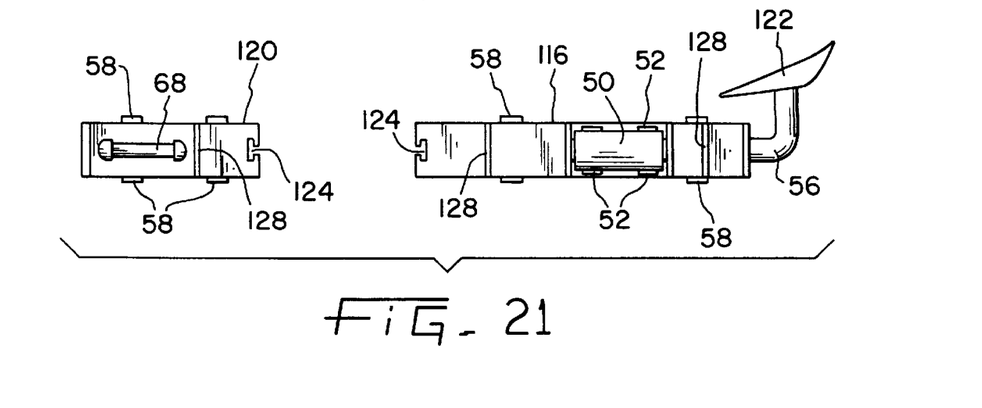
FIG. 21 is a top view of the visor core of FIG. 19 with the middle component removed.

A segmented elongate visor core assembly 114 is shown in FIGS. 19–21. The segmented assembly 114 includes 3 sections, a hinge block section 116, a middle section 118 and a pin section 120. The width "W" (FIG. 20) to height "H" (FIG. 19) ratio of the segmented assembly 114 is preferably within the range of eight to eleven, although the assembly 114 is not limited to this range of width to height ratios.

The hinge block section 116 includes apertures 64 which enable the attachment of a detent clamp 50 to section 116 with rivets 52. The detent clamp 50 is rotatably attached to visor support rod 56. Rod guides 66 maintain the hinge block section 116 in proper alignment with visor support rod 56. Attached to visor support rod 56 opposite the hinge block section 116 is a mounting bracket 122 which enables the attachment of the sun visor assembly 30 to the interior of a vehicle. As is conventional, mounting bracket 122 and visor support rod 56 allow pivoting of the entire sun visor assembly 30 between positions in juxtaposition with the front windshield and side window, as well as providing a horizontal axis about which the sun visor body rotates between a storage position and a window covering position.

Pin section 120 includes a support member in the form of cylindrical pin 68 which may engage a retainer clip and thereby provide a point of support for the free end of sun visor assembly 30 after the assembly 30 has been installed in a vehicle. The hinge block section 116 and pin section 120 are secured to the middle section 118 with interfitting T-shaped pegs 100 and T-shaped slots 124. In the embodiment shown in FIGS. 19 and 20, T-shaped pegs 100 extend from middle section 118 and are slid downward into cooperating T-shaped slots in sections 116 and 120.

The middle section 118 may be manufactured in different lengths to allow the segmented visor core assembly 114 to be used with outer coverings 32 which have differing lengths. In this way, a single hinge block section 116 and pin section 120 design can be manufactured for use with a plurality of differently configured outer coverings 32. The modularity of the different sections also permits the substitution of a different hinge block or pin section design without requiring the alteration of the other section designs. The middle section 118 can be omitted entirely, as shown in FIG. 21, if the structural support provided by section 118 is not required.

It is envisioned that hinge block section 116 and pin section 120 may have aligned tracks 92 disposed on their bottom surface to engage the upper edge of visor extension panel 108 and that a middle section 118 and a bottom track 92 would be unnecessary. Of course, alternative embodiments could utilize a middle section 118 having a track 92 disposed on its bottom surface and a bottom track 92 disposed on an elongate member 93 could also be utilized if desired.

All of the sections, 116, 118 and 120, have pegs 58 which mate with holes 60 in the rigid foundation 34 of an outer covering 32. Sections 116, 118 and 120 also include ribs 126 and ridges 128 which provide structural strength to the sections 116, 118 and 120. The ridges 128 also help to define the exterior shape of the outer covering 32 when it is folded over the visor core assembly 114 or any of its individual components.

Preferably, the visor core components have common alignment elements, e.g., pegs 58, which are located in predetermined locations. By utilizing differently shaped outer coverings 32 having a plurality of alignment elements in a standard arrangement, e.g., holes 60, the differently configured outer coverings 32 can each utilize similar visor core components. Thus, a limited number of visor core component designs can be utilized with a large number of different outer covering 32 designs.

The use of modular visor core components also permits a single outer covering to be manufactured with alignment elements which cooperate with a number of different visor core components. During manufacture of the sunshade assembly 30 one or more visor core components could be secured to the outer covering. Not all of alignment elements present on the outer covering, however, would have to be utilized for the manufacture of each sunshade assembly. Thus, a single outer covering design could be used to manufacture sunshade assemblies having a different number of visor core components. Thus, the functional features of the sunshade assembly would depend in part upon the number of visor core components installed in the outer covering.

Additionally, different designs of a single type of visor core component, e.g., different vanity mirror assemblies, could utilize the same configuration of alignment elements thereby enabling the same outer covering assembly to be used with a variety of different visor core component designs. Thus, the functional features of the sunshade assembly could also be easily altered by changing the combination of visor core components used to manufacture the sunshade assembly. This use of modular visor core components also permits the redesign of a single visor core component without requiring the alteration of the remaining component designs.

Furthermore, the use of a unique alignment element configuration can be used to limit the installation of a particular visor core component to a particular outer covering.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sun visor assembly for use in a vehicle comprising:

a track component having a track alignment element, and a rail connected to said track component;

a sliding member having a pair of opposing arms extending therefrom, said pair of opposing arms disposed directly opposite one another and forming a clip which slidably engages said rail; and a folded outer covering assembly having opposing flaps with an inner folded surface and an outer folded surface, said inner folded surface comprising a covering alignment element which mates with said track alignment element whereby said track component is secured between said flaps and said sliding member is slidably disposed within said flaps.

2. The sun visor assembly of claim 1, further comprising:

a visor support rod for attaching said sun visor to the vehicle; and an elbow projecting from said track component, said elbow including a rod guide, said visor support rod slidingly disposed within said rod guide.

3. The sun visor assembly of claim 2, wherein said sliding member is a hinge block which rotatably engages a visor support rod.

4. The sun visor assembly of claim 3, wherein said opposing arms have a semicircular shaped cross section and said rail has a substantially round cross section.

5. A sun visor assembly for use in a vehicle, comprising:

two opposing flaps folded together;

a track disposed between said flaps and secured to at least one of said flaps, said track having a rail connected thereto, said track further having an elbow, said elbow including a rod guide;

a hinge block slidably and nonrotatably disposed between said flaps, said hinge block including a pair of opposing arms extending therefrom, said pair of opposing arms disposed directly opposite one another and forming a clip, said clip slidably engaging said rail; and a visor support rod for attaching said sun visor to a vehicle interior member, said visor support rod slidably disposed within said rod guide, and said visor support rod connected at one end to said hinge block and slidable therewith, the other end of said visor support rod extending outwardly from said flaps, said hinge block rotatable about the longitudinal axis of said rod and said flaps rotatable therewith, whereby said sun visor is pivotable about the longitudinal axis of said rod and said rod is extendable and retractable from said sun visor.

6. The sun visor assembly of claim 5, wherein said opposing arms have a semicircular shaped cross section and said rail has a substantially round cross section.

7. A sun visor assembly comprising:

a visor support rod;

a plurality of visor core components, each of said visor core components having a core alignment element; and a folded outer covering assembly having opposing flaps with an inner folded surface and an outer folded surface, said inner folded surface comprising a plurality of covering alignment elements which mate with said core alignment elements whereby said visor core components are secured between said flaps and have exterior surfaces which are in substantial registry with said interior surface of said opposing flaps;

said plurality of visor core components further including:

a track non-slidingly secured to said outer covering assembly, said track having a rail extending therefrom, said track further having an elbow, said elbow including a rod guide, said visor support rod slidably disposed within said rod guide; and a sliding member having a pair of opposing arms extending therefrom, said pair of opposing arms disposed directly opposite one another and forming a clip, said clip slidingly engaging said rail.

* * * * *